US012603285B2

(12) United States Patent
Jung et al.

(10) Patent No.: US 12,603,285 B2
(45) Date of Patent: Apr. 14, 2026

(54) BATTERY INCLUDING ELECTRODE ASSEMBLY AND ELECTRONIC DEVICE INCLUDING THE SAME

(71) Applicant: SAMSUNG ELECTRONICS CO., LTD., Suwon-si (KR)

(72) Inventors: Sinyoung Jung, Suwon-si (KR); Jonggyu Park, Suwon-si (KR); Yeonil Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 770 days.

(21) Appl. No.: 17/941,553

(22) Filed: Sep. 9, 2022

(65) Prior Publication Data

US 2023/0064291 A1 Mar. 2, 2023

Related U.S. Application Data

(63) Continuation of application No. PCT/KR2022/011973, filed on Aug. 11, 2022.

(30) Foreign Application Priority Data

Sep. 1, 2021 (KR) ........................ 10-2021-0116446

(51) Int. Cl.
H01M 4/62 (2006.01)
H01M 4/13 (2010.01)
(Continued)

(52) U.S. Cl.
CPC .............. H01M 4/62 (2013.01); H01M 4/13 (2013.01); H01M 4/70 (2013.01);
(Continued)

(58) Field of Classification Search
CPC ............ H01M 4/62; H01M 4/13; H01M 4/70; H01M 50/247; H01M 50/105;
(Continued)

(56) References Cited

U.S. PATENT DOCUMENTS

2003/0224242 A1* 12/2003 Kaito ................. H01M 50/193
                                                 429/231.95
2021/0234203 A1* 7/2021 Jang ................. H01M 10/0431
                         (Continued)

FOREIGN PATENT DOCUMENTS

JP        2004-055537 A    2/2004
JP        2011-81941 A     4/2011
                 (Continued)

OTHER PUBLICATIONS

International Search Report (PCT/ISA/210), dated Nov. 22, 2022, in App No. PCT/KR2022/011973.
Communication dated Jan. 14, 2026, issued by the Korean Ministry of Intellectual Property in Korean Application No. 10-2021-0116446.

*Primary Examiner* — Keith Walker
*Assistant Examiner* — Steven S Ha
(74) *Attorney, Agent, or Firm* — Sughrue Mion, PLLC

(57) ABSTRACT

A battery includes an electrode assembly including a cathode including a cathode collector, a cathode active material layer provided in a first region of a surface of the cathode collector, and an insulating layer provided in a second region of the surface of the cathode collector and adjacent to the cathode active material layer, an anode including an anode collector and an anode active material layer provided in a region of a surface of the anode collector and a separator provided between the cathode and the anode. At least a portion of the separator is configured to be attached to at least a portion of the insulating layer.

20 Claims, 9 Drawing Sheets

(51) Int. Cl.

| | |
|---|---|
| *H01M 4/70* | (2006.01) |
| *H01M 10/0525* | (2010.01) |
| *H01M 10/0587* | (2010.01) |
| *H01M 50/105* | (2021.01) |
| *H01M 50/244* | (2021.01) |
| *H01M 50/247* | (2021.01) |
| *H01M 50/46* | (2021.01) |
| *H01M 4/02* | (2006.01) |

(52) U.S. Cl.
CPC ... *H01M 10/0525* (2013.01); *H01M 10/0587* (2013.01); *H01M 50/105* (2021.01); *H01M 50/244* (2021.01); *H01M 50/247* (2021.01); *H01M 50/461* (2021.01); *H01M 2004/021* (2013.01); *H01M 2004/028* (2013.01); *H01M 2220/30* (2013.01)

(58) Field of Classification Search
CPC ............. H01M 50/244; H01M 50/461; H01M 10/0525; H01M 10/0587
See application file for complete search history.

(56) References Cited

U.S. PATENT DOCUMENTS

| | | | | |
|---|---|---|---|---|
| 2022/0131217 | A1* | 4/2022 | Kim | ........................... B32B 7/14 |
| 2022/0200058 | A1* | 6/2022 | Wang | .................. H01M 50/586 |

FOREIGN PATENT DOCUMENTS

| | | | | | |
|---|---|---|---|---|---|
| JP | 5427046 | B2 | 2/2014 | | |
| KR | 10-2005-0096926 | A | 10/2005 | | |
| KR | 10-2014-0009037 | A | 1/2014 | | |
| KR | 10-2015-0098445 | A | 8/2015 | | |
| KR | 10-2019-0090305 | A | 8/2019 | | |
| KR | 10-2019-0138451 | A | 12/2019 | | |
| KR | 10-2152143 | B1 | 9/2020 | | |
| KR | 10-2020-0132351 | A | 11/2020 | | |
| KR | 10-2207132 | B1 | 1/2021 | | |
| WO | WO-2019146872 | A1 * | 8/2019 | ........... | B32B 15/085 |
| WO | 2021/015441 | A1 | 1/2021 | | |
| WO | WO-2021047450 | A1 * | 3/2021 | ........ | H01M 10/0431 |

* cited by examiner

BATTERY INCLUDING ELECTRODE ASSEMBLY AND ELECTRONIC DEVICE INCLUDING THE SAME

CROSS-REFERENCE TO RELATED APPLICATIONS

This application is a bypass continuation application of International Application No. PCT/KR2022/011973 designating the United States, filed on Aug. 11, 2022, in the Korean Intellectual Property Receiving Office and claiming priority to Korean Patent Application No. 10-2021-0116446, filed on Sep. 1, 2021, in the Korean Intellectual Property Office, the disclosures of which are incorporated by reference herein in their entireties.

BACKGROUND

1. Field

The disclosure relates generally to a battery including an electrode assembly and an electronic device including the battery.

2. Description of Related Art

An electronic device may include a device that performs a specific function according to a loaded program, such as a home appliance, an electronic notebook, a portable multimedia player, a mobile communication terminal, a tablet personal computer (PC), a video/audio device, a desktop/laptop computer, or a vehicle navigation system. For example, such electronic devices may output stored information as sound or images. Along with an increase in the integration level of electronic devices and the increasing popularity of ultra-high-speed, large-capacity wireless communication, various functions have recently been loaded in a single electronic device, such as a mobile communication terminal. For example, an entertainment function, such as gaming, a multimedia function, such as music/video play, a communication and security function for mobile banking, a scheduling function, and an electronic wallet function as well as a communication function have been integrated into a single electronic device.

The electronic device may be developed to be wearable by a user for improving the mobility and accessibility of the user. The electronic device may include a battery to supply power for mobility and accessibility.

An electronic device may include a battery that includes a cathode, an anode, and a separator disposed therebetween to prevent the cathode from contacting the anode. When the cathode contacts the anode, an internal short circuit may occur.

SUMMARY

To prevent an internal short circuit, a separator may be formed in a size greater (e.g., overhang) than a cathode and an anode. When the separator is packaged as the battery, energy density may decrease as a portion in which the size of the separator is greater than the size of the cathode and the anode, and curling due to external impact caused by moving of the separator may occur.

According to various example embodiments, a battery including an electrode assembly that reduces an inefficient space while separating a cathode and an anode may be provided by forming an uncoated region of the cathode, forming an insulating layer in the uncoated region, and attaching a separator in the size similar to the size of the cathode, to at least a portion of the insulating layer.

Provided is a battery that reduces curling of a separator due to external impact may be provided by fixing a cathode to the separator.

Provided is a battery of which energy density is improved by reducing overhang of the separator by comparing with both electrodes.

Additional aspects will be set forth in part in the description which follows and, in part, will be apparent from the description, or may be learned by practice of the presented embodiments.

According to an aspect of the disclosure, a battery may include an electrode assembly including a cathode including a cathode collector, a cathode active material layer provided in a first region of a surface of the cathode collector, and an insulating layer provided in a second region of the surface of the cathode collector and adjacent to the cathode active material layer, an anode including an anode collector and an anode active material layer provided in a region of a surface of the anode collector and a separator provided between the cathode and the anode. At least a portion of the separator may be attached to at least a portion of the insulating layer.

According to an aspect of the disclosure, an electronic device may include a housing including a front plate, a rear plate, and a bracket configured to enclose a gap between the front plate and the rear plate, a display configured to display information through at least a region of the front plate of the housing, and a battery configured to be mounted in a mounting groove of the bracket. The battery may include an electrode assembly. The electrode assembly may include a cathode collector, a cathode active material layer provided in a first region of a surface of the cathode collector, and an insulating layer provided in a second region of the surface of the cathode collector and adjacent to the cathode active material layer, an anode including an anode collector and an anode active material layer provided in a region of a surface of the anode collector, and a separator provided between the cathode and the anode. At least a portion of the separator may be configured to be attached to at least a portion of the insulating layer.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
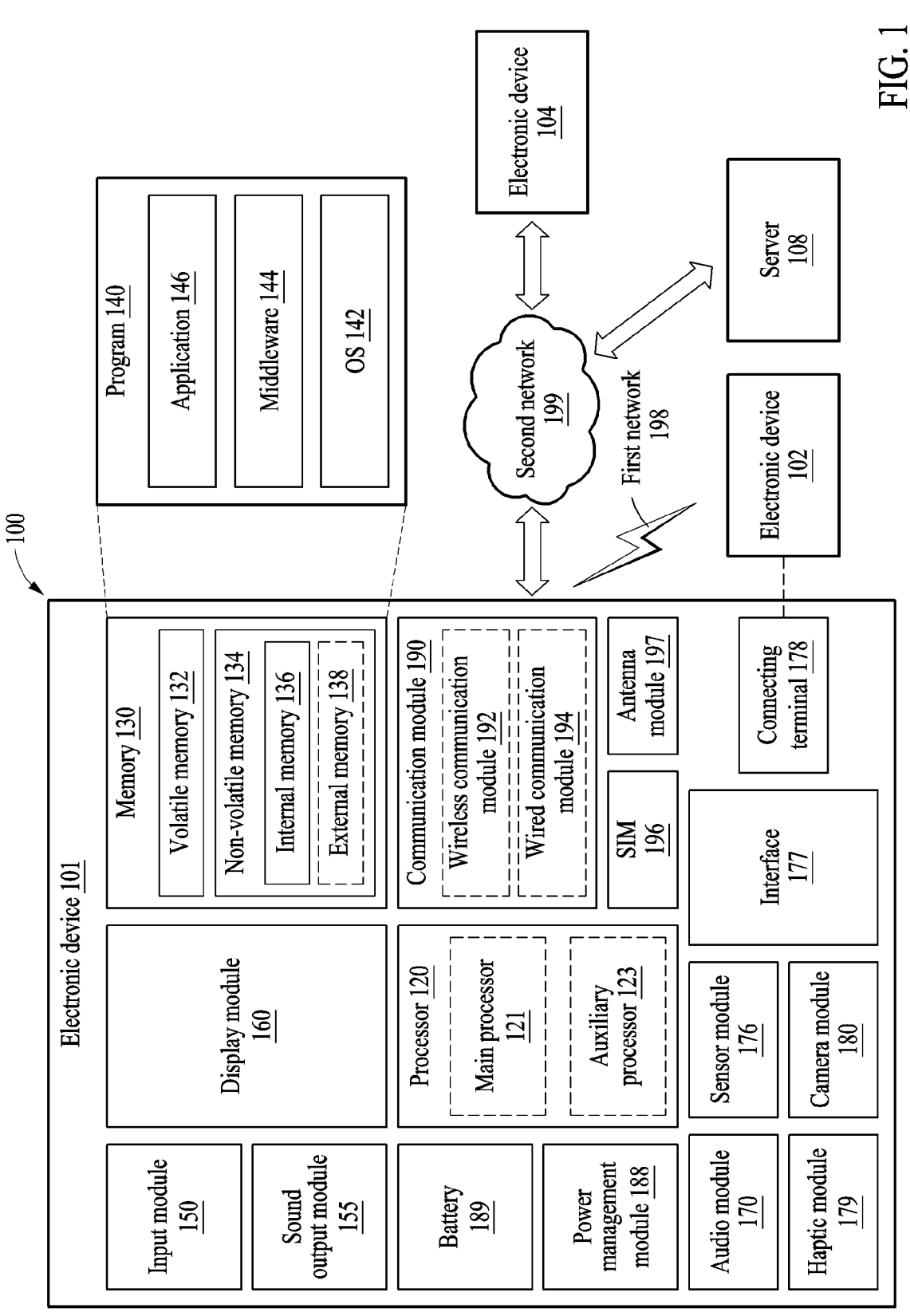
FIG. 1 is a block diagram of an electronic device in a network environment according to various example embodiments.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display device 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input device 150 or output the sound via the sound output device 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
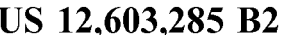
FIG. 2 is a block diagram of a power management module and a battery according to various example embodiments.
Figure 2:
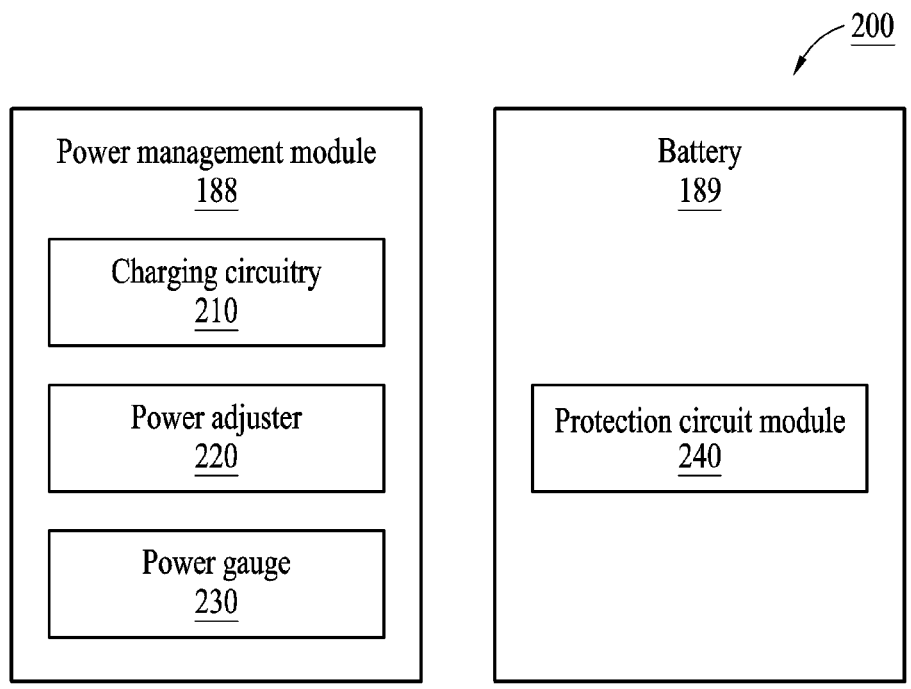

FIG. 2 is a block diagram 200 of a power management module 188 and a battery 189 according to various example embodiments. Referring to FIG. 2, the power management module 188 may include a charging circuitry 210, a power adjuster 220, or a power gauge 230. The charging circuitry 210 may charge the battery 189 using power supplied from an external power source outside the electronic device 101. According to an example embodiment, the charging circuitry 210 may select a charging scheme (e.g., normal charging or quick charging) based at least in part on a type of the external power source (e.g., a power outlet, a USB charger, or wireless charging), the magnitude of power able to be supplied from the external power source (e.g., about 20 Watts or more), or an attribute of the battery 189, and may charge the battery 189 by using the selected charging scheme. The external power source may be connected with the electronic device 101, for example, directly via the connecting terminal 178 or wirelessly via the antenna module 197.

The power adjuster 220 may generate pieces of power having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an example embodiment, the power adjuster 220 may be implemented in the form of a low drop out (LDO) regulator or a switching regulator. The power gauge 230 may measure use state information about the battery 189 (e.g., the capacity, the number of times charging or discharging, voltage, or the temperature of the battery 189).

The power management module 188 may determine, using, for example, the charging circuitry 210, the power adjuster 220, or the power gauge 230, charging state information (e.g., lifetime, over-voltage, low voltage, over-current, over-charge, over-discharge, overheat, short, or swelling) related to the charging of the battery 189, based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an example embodiment, at least some of the functions of the power management module 188 may be performed by an external control device (e.g., the processor 120).

According to an example embodiment, the battery 189 may include a protection circuit module (PCM) 240. The PCM 240 may perform one or more of various functions (e.g., a pre-cutoff function) to prevent performance deterioration of, or damage to, the battery 189. The PCM 240, additionally or alternatively, may be configured as at least part of a battery management system (BMS) capable of performing various functions including cell balancing, measurement of battery capacity, count of the number of charging or discharging cycles, measurement of temperature, or measurement of voltage.

According to an example embodiment, at least part of the charging state information or use state information regarding the battery 189 may be measured using a corresponding sensor (e.g., a temperature sensor) of a sensor module 276, the power gauge 230, or the power management module 188. According to an example embodiment, the corresponding sensor (e.g., a temperature sensor) of the sensor module 176 may be included as part of the PCM 240, or may be disposed near the battery 189 as a separate device.

Figure 3:
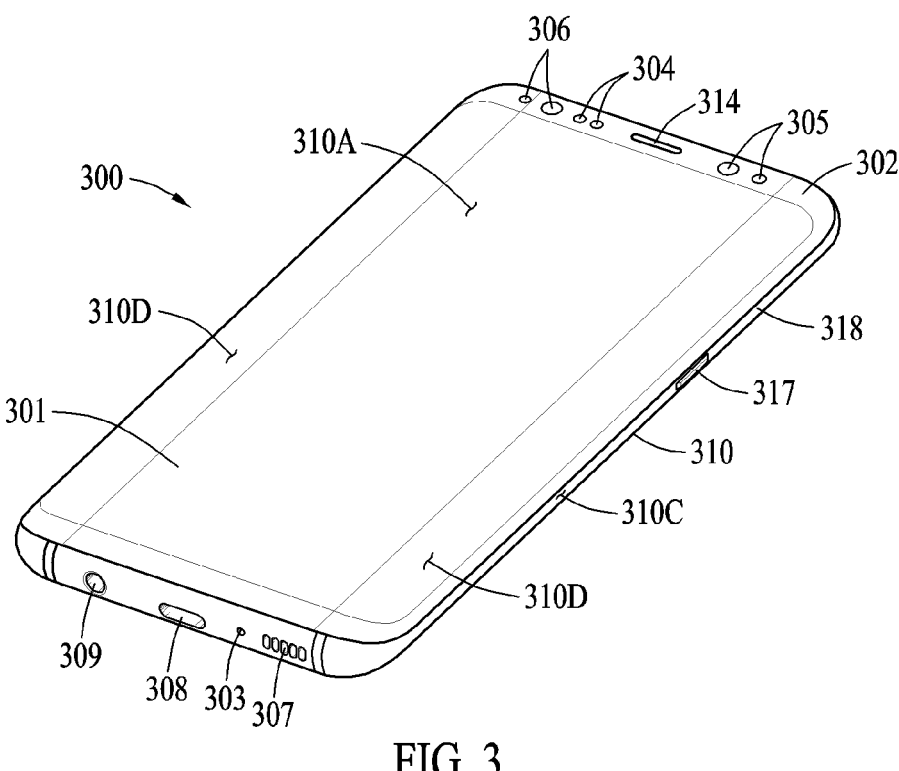
FIG. 3 is a diagram of a front surface of a mobile electronic device according to an example embodiment.
Figure 4:
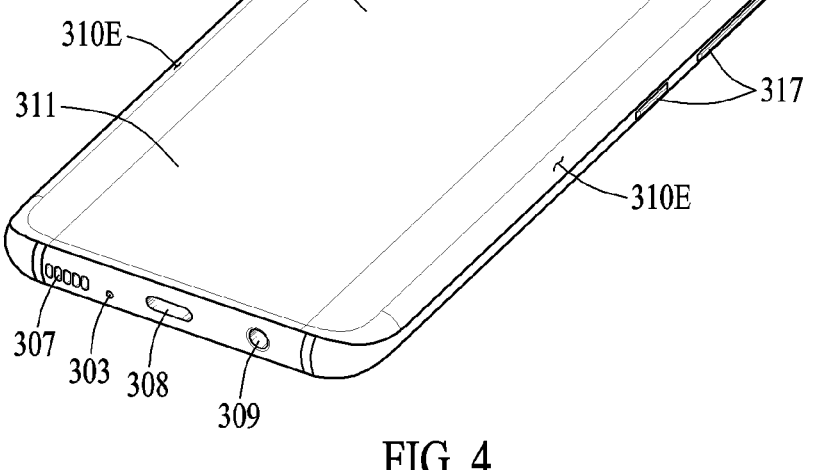
FIG. 4 is a diagram of a rear surface of the mobile electronic device according to various example embodiments.

FIG. 3 is a diagram of a front surface of a mobile electronic device according to an example embodiment. FIG. 4 is a diagram of a rear surface of the mobile electronic device according to various example embodiments Referring to FIGS. 3 and 4, an electronic device 300 according to an example embodiment may include a housing 310 including a first surface (or a front surface) 310A, a second surface (or a rear surface) 310B, and a side surface 310C enclosing a space between the first surface 310A and the second surface 310B. In an example embodiment, the housing 310 may also refer to a structure which forms a portion of the first surface 310A, the second surface 310B, and the side surface 310C of FIG. 3. According to an example embodiment, the first surface 310A may be formed by a front plate 302 (e.g., a glass plate or a polymer plate including various coating layers) of which at least a portion is substantially transparent. The second surface 310B may be formed of a rear plate 311 that is substantially opaque. The rear plate 311 may be formed of, for example, coated or tinted glass, ceramic, polymer, metal (e.g., aluminum, stainless steel (STS), or magnesium), or any combination of any two or more of the above materials. The side surface 310C may be coupled to the front plate 302 and the rear plate 311 and may be formed by a side bezel structure (or a "side member") 318 including metal and/or polymer. In an example embodiment, the rear plate 311 and the side bezel structure 318 may be integrally formed and may include the same material (e.g., a metal material such as aluminum).

In the illustrated example embodiment, the front plate 302 may include two first regions 310D that are curved and seamlessly extend from the first surface 310A toward the rear plate 311 at both ends of a long edge of the front plate 302. In the illustrated example embodiment (see FIG. 4), the rear plate 311 may include two second regions 310E that are curved and seamlessly extend from the second surface 310B toward the front plate 302 at both ends of a long edge of the rear plate 311. In some example embodiments, the front plate 302 (or the rear plate 311) may include only one of the first regions 310D (or the second regions 310E). In an example embodiment, some of the first regions 310D or the second regions 310E may not be included. In the above example embodiments, in a side view of the electronic device 300, the side bezel structure 318 may have a first thickness (or width) at a side in which the first regions 310D or the second regions 310E are not included, and may have a second thickness that is less than the first thickness at a side in which the first regions 310D or the second regions 310E are included.

According to an example embodiment, the electronic device 300 may include at least one of a display 301, audio modules 303, 307, and 314, sensor modules 304, 316, and 319, camera modules 305, 312, and 313, key input devices 317, a light-emitting element 306, and connector holes 308 and 309. In some example embodiments, the electronic device 300 may not include at least one (e.g., the key input devices 317 or the light-emitting element 306) of the components above, or may additionally include other components.

The display 301 may be exposed through, for example, some portions of the front plate 302. In some example embodiments, at least a portion of the display 301 may be exposed through the first surface 310A and the front plate 302 forming the first regions 310D of the side surface 310C. In some example embodiments, an edge of the display 301 may be formed to be substantially the same as the shape of the periphery of the front plate 302 adjacent thereto. In another example embodiment, a distance between the edge of the display 301 and the periphery of the first plate 302 may be substantially the same to expand the exposed area of the display 301.

In an example embodiment, a recess or an opening may be formed in a portion of a screen display area of the display 301, and at least one of the audio module 314, the sensor module 304, the camera module 305, and the light-emitting element 306 that are aligned with the recess or the opening may be included. In an example embodiment, at least one of the audio module 314, the sensor module 304, the camera module 305, the sensor module 316 (i.e., a fingerprint sensor), and the light-emitting element 306 may be included on a rear surface of the screen display area of the display 301. In another example embodiment, the display 301 may be coupled to or disposed adjacent to a touch sensing circuit, a pressure sensor for measuring an intensity (pressure) of a touch, and/or a digitizer for detecting a magnetic-type stylus pen. In some example embodiments, at least some of the sensor modules 304 and 319, and/or at least some of the key input devices 317 may be disposed in the first regions 310D and/or the second regions 310E.

The audio modules 303, 307, and 314 may include a microphone hole (e.g., the audio module 303) and speaker holes (e.g., the audio modules 307 and 314). A microphone for acquiring external sound may be disposed in the microphone hole (e.g., the audio module 303). In some example embodiments, a plurality of microphones may be disposed to detect a direction of sound. The speaker holes (the audio modules 307 and 314) may include an external speaker hole (the audio module 307) and a receiver hole for a call (the audio module 314). In some example embodiments, the speaker holes (e.g., the audio modules 307 and 314) and the microphone hole (e.g., the audio module 303) may be implemented as a single hole, or a speaker (e.g., a piezo speaker) may be included without the speaker holes (e.g., the audio modules 307 and 314).

The sensor modules 304, 316, and 319 may generate an electrical signal or a data value corresponding to an internal operational state of the electronic device 300 or an external environmental state. The sensor modules 304, 316, and 319 may include, for example, a first sensor module 304 (e.g., a proximity sensor) and/or a second sensor module (e.g., a fingerprint sensor) disposed on the first surface 310A of the housing 310, and/or a third sensor module 319 (e.g., a heart rate monitoring (HRM) sensor) and/or a fourth sensor module 316 (e.g., a fingerprint sensor) disposed on the second surface 310B of the housing 310. The fingerprint sensor may be disposed on both the first surface 310A (e.g., the display 301) and the second surface 310B of the housing 310. The electronic device 300 may further include at least one of sensor modules, for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and an illuminance sensor.

The camera modules 305, 312, and 313 may include a first camera device 305 disposed on the first surface 310A of the electronic device 300, a second camera device 312 disposed on the second surface 310B, and/or a flash 313. The camera modules 305 and 312 may each include one or more lenses, an image sensor, and/or an image signal processor. The flash 313 may include, for example, an LED or a xenon lamp. In some example embodiments, two or more lenses (e.g., an IR camera, wide-angle lenses, and telephoto lenses) and image sensors may be disposed on one surface of the electronic device 300.

The key input devices 317 may be disposed on the side surface 310C of the housing 310. In another example embodiment, the electronic device 300 may not include some or all of the key input devices 317 mentioned above, and the key input device 317 that is not included may be implemented in another form such as a soft key on the display 301. In some example embodiments, the key input devices 317 may include the sensor module 316 disposed on the second surface 310B of the housing 310.

The light-emitting element 306 may be disposed on, for example, the first surface 310A of the housing 310. The light-emitting element 306 may provide, for example, state information of the electronic device 300 in the form of light. In another example embodiment, the light-emitting element 306 may provide, for example, a light source that is linked to the operation of the camera module 305. The light-emitting element 306 may include, for example, an LED, an IR LED, and a xenon lamp.

The connector holes 308 and 309 may include a first connector hole 308 for accommodating a connector (e.g., a USB connector) for transmitting and receiving power and/or data to and from an external electronic device, and/or a second connector hole 309 (e.g., an earphones jack) for accommodating.

Figure 5:
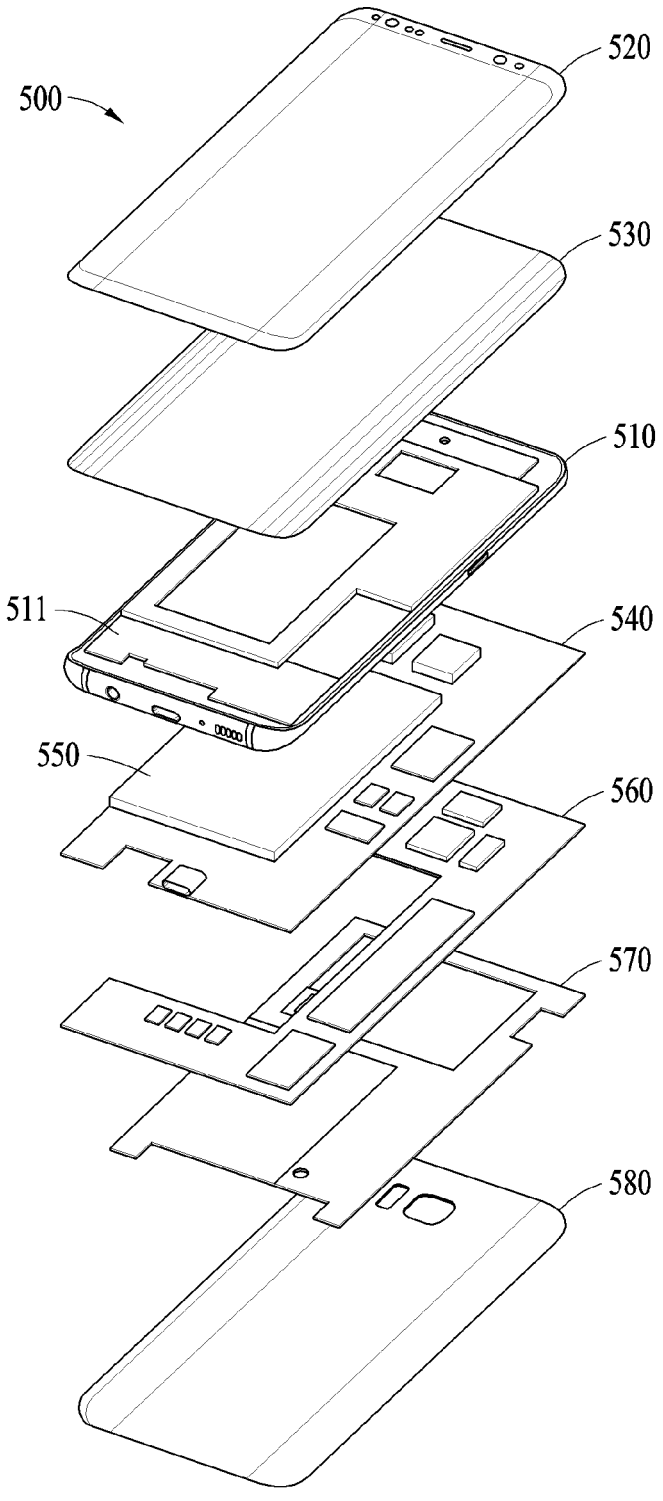
FIG. 5 is a diagram of the electronic device of FIG. 3 according to various example embodiments.

FIG. 5 is a diagram of the electronic device of FIG. 3 according to various example embodiments. Referring to FIG. 5, an electronic device 500 may include a side bezel structure 510, a first support member 511 (e.g., a bracket), a front plate 520, a display 530, a printed circuit board (PCB) 540, a battery 550, a second support member 560 (e.g., a rear case), an antenna 570, and a rear plate 580. In some example embodiments, the electronic device 500 may not include at least one (e.g., the first support member 511 or the second support member 560) of the components, or may additionally include other components. At least one of the components of the electronic device 500 may be the same as or similar to at least one of the components of the electronic device 300 of FIG. 3 or the electronic device of FIG. 4, and accordingly a repeated description thereof will be omitted hereinafter.

The first support member 511 may be disposed inside the electronic device 500 and connected to the side bezel structure 510, or may be formed integrally with the side bezel structure 510. The first support member 511 may be formed of, for example, a metal material and/or a non-metal material (e.g., polymer). The display 530 may be connected to one surface of the first support member 511, and the PCB 540 may be connected to the other surface of the first support member 511. The PCB 540 may be provided with a processor, a memory, and/or an interface. The processor may include, for example, one or more of a CPU, an AP, a GPU, an ISP, a sensor hub processor, or a CP.

The memory may include, for example, a volatile memory or a non-volatile memory.

The interface may include, for example, an HDMI, a USB interface, a SD card interface, or an audio interface. The interface may include, for example, a USB connector, an SD card/multimedia connect (MMC) connector, or an audio connector, to connect, electrically or physically, the electronic device 500 to an external electronic device.

The battery 550, which is a device for supplying power to at least one component of the electronic device 500, may include, for example, a non-rechargeable primary battery, a rechargeable secondary battery, or a fuel cell. For example, at least a portion of the battery 550 may be disposed on substantially the same plane as the PCB 540. The battery 550 may be disposed integrally inside the electronic device 500, or disposed detachably from the electronic device 500.

The antenna 570 may be disposed between the rear plate 580 and the battery 550. The antenna 570 may include, for example, a near field communication (NFC) antenna, a wireless charging antenna, and/or a magnetic secure transmission (MST) antenna. The antenna 570 may perform short-range communication with an external device, or may wirelessly transmit and receive required charging power to and from the external device. In an example embodiment, an antenna structure may be formed by a portion of the side bezel structure 510 and/or the first support member 511 or a combination thereof.

Figure 6:
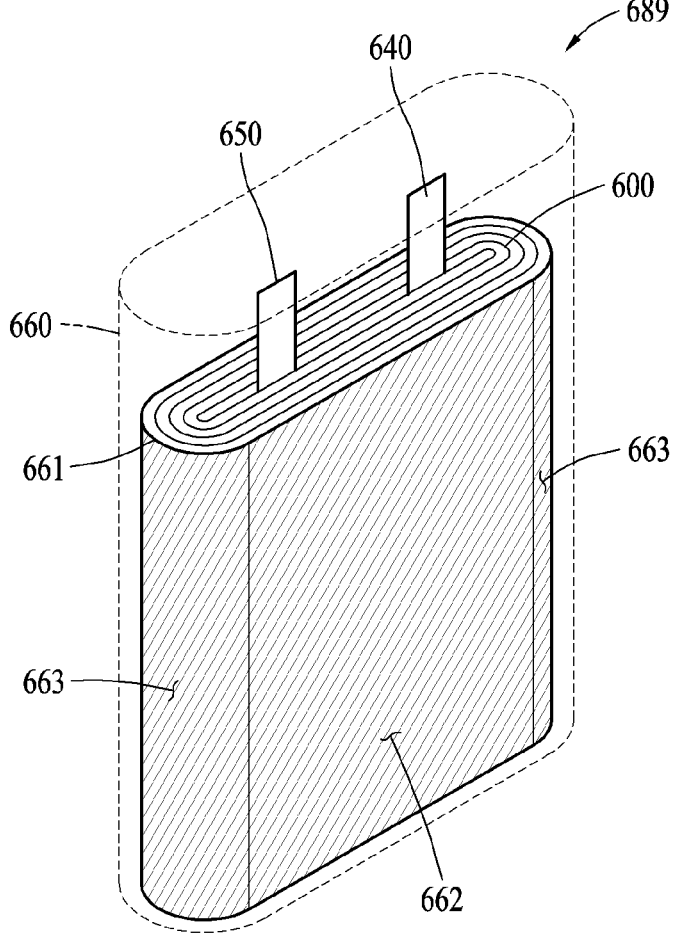
FIG. 6 is a diagram of a structure of a battery according to various example embodiments.

FIG. 6 is a diagram of a structure of a battery according to various example embodiments.

Referring to FIG. 6, according to various example embodiments, a battery 689 (e.g., the battery 189 of FIG. 1 and the battery 550 of FIG. 5) may include an electrode assembly 600, a cathode tab 640, an anode tab 650, and a pouch 660.

According to various example embodiments, the pouch 660 may include an inner space to accommodate the electrode assembly 600. According to various example embodiments, the electrode assembly 600 may be formed in a winding structure in which a cathode, an anode, and a separator overlap with each other and are wound. For example, the electrode assembly 600 may be formed in a jelly roll shape. According to various example embodiments, the cathode tab 640 may be attached to one end of the cathode to be exposed to the outside and the anode tab 650 may be attached to one end of the anode to be exposed to the outside. According to various example embodiments, the electrode assembly 600 may be formed in a stack structure in which cathodes and anodes are alternately stacked with each other and a separator is formed between the cathode and the anode. According to various example embodiments, the cathodes may be integrally formed as one and may be formed to be bent at a predetermined width and the anodes may be formed in substantially the same shape as the cathodes.

According to various example embodiments, the outer surface of the electrode assembly 600 may be formed in a plane 662 or a curved surface 663. For example, the electrode assembly 600 may be generally formed in the plane 662 and some regions thereof may be formed in the curved surface 663. According to various example embodiments, the electrode assembly 600 may be generally formed in the curved surface 663 depending on a winding manner. According to various example embodiments, to attach the electrode assembly 600 to the pouch 660, an adhesive member 661 may be formed on the outer surface of the electrode assembly 600. According to various example embodiments, the adhesive member 661 may be formed to enclose the outer surface of the electrode assembly 600 and may have even adhesion between the electrode assembly 600 and the pouch 660. For example, the adhesive member 661 may be formed on the entire outer surface of the electrode assembly 600 and the entire outer surface of the electrode assembly 600 may be attached to the inner surface of the pouch 660. According to various example embodiments, the electrode assembly 600 may adhere to the inner space of the pouch 660 and may be fixed to the pouch 660 without moving or shaking.

Figure 7:
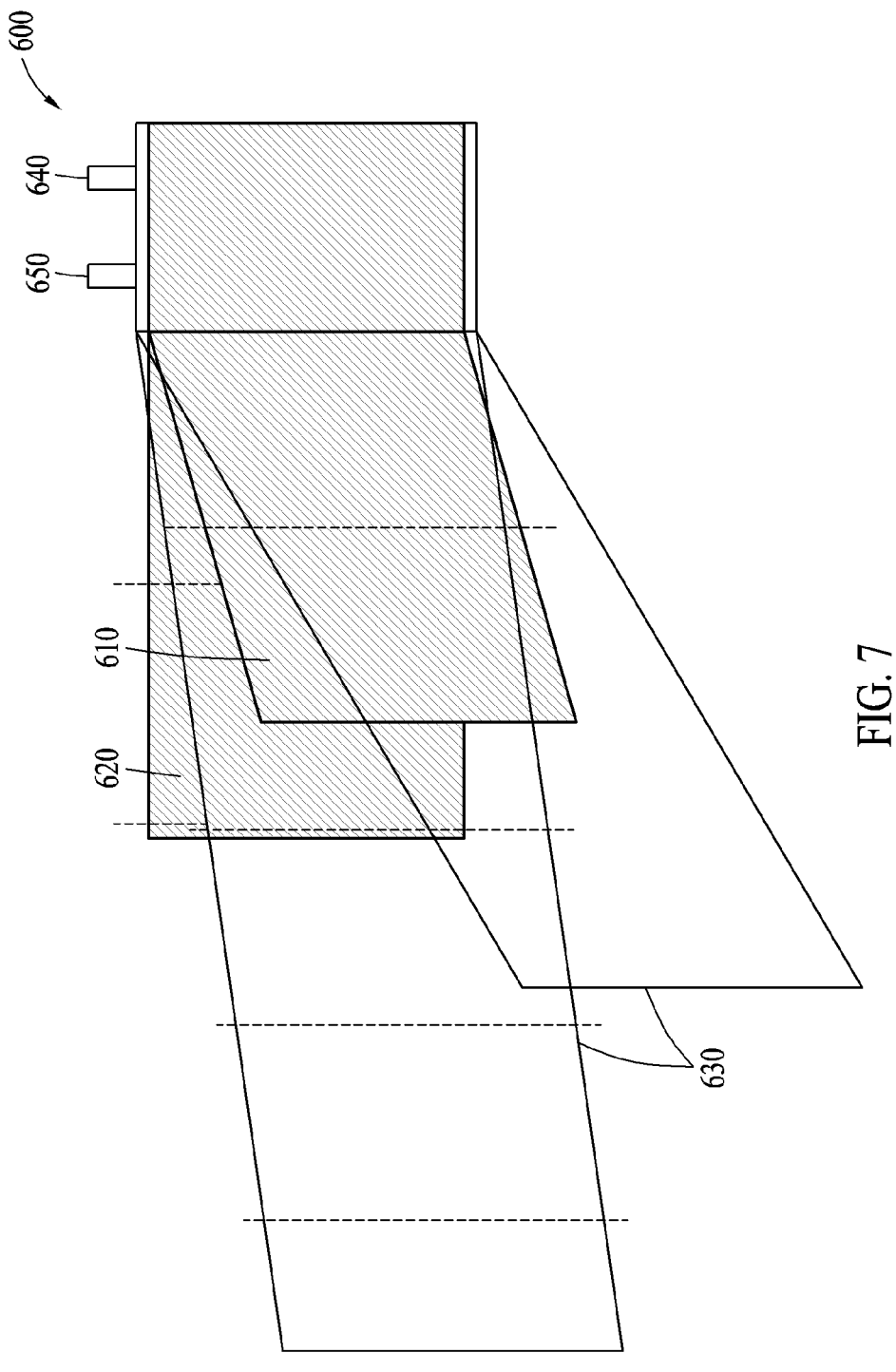
FIG. 7 is a diagram of a battery according to various example embodiments.

FIG. 7 is a diagram of a battery according to various example embodiments.

Referring to FIG. 7, according to various example embodiments, the electrode assembly 600 may include a cathode 610, an anode 620, and a separator 630. According to various embodiments, the cathode 610, the anode 620, and the separator 630 may form a winding structure by overlapping each other and being wound. According to various example embodiments, the electrode assembly 600 may include the separator 630 disposed between the cathode 610 and the anode 620, and another separator 630 may be disposed in a counter surface, of the cathode 610, to the surface on which the separator 630 is disposed.

According to various example embodiments, the electrode assembly 600 may convert chemical energy of the cathode 610 and the anode 620 into electrical energy. According to various example embodiments, the electrode assembly 600 may supply power to a circuit (e.g., the power management module 188 of FIG. 2) implemented in an electronic device (e.g., the electronic device 101 of FIG. 1) through the cathode tab 640 connected to the cathode 610 and the anode tab 650 connected to the anode 620.

Figure 8:
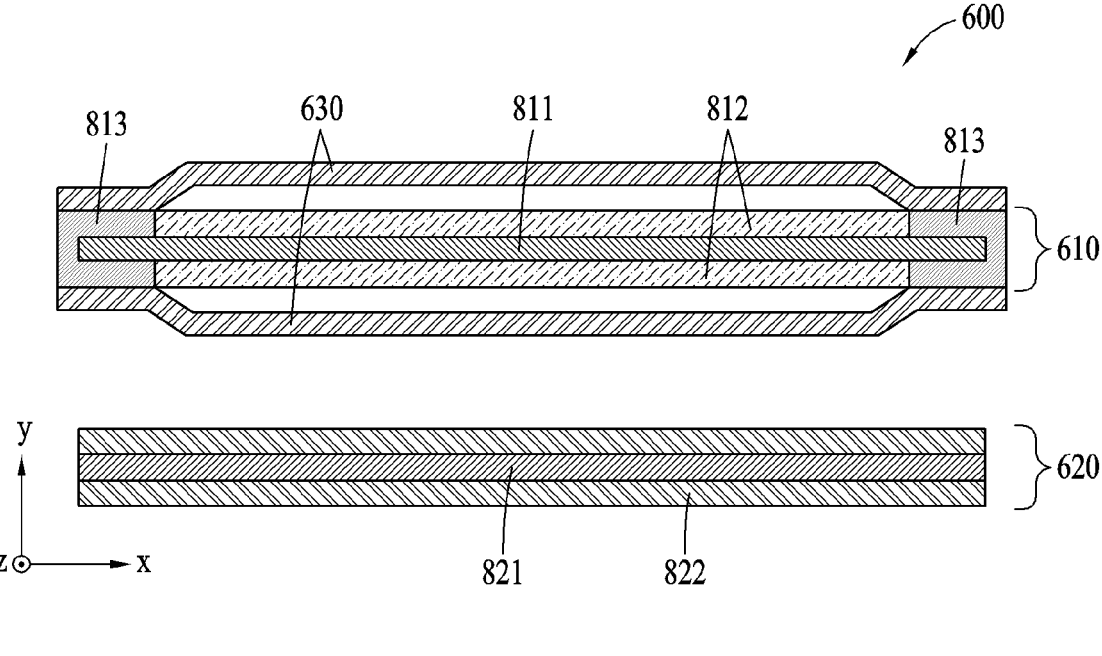
FIG. 8 is a diagram of an electrode assembly according to various example embodiments.

FIG. 8 is a diagram of an electrode assembly according to various example embodiments.

According to various example embodiments, referring to FIG. 8, a battery (e.g., the battery 189 of FIG. 1, the battery 550 of FIG. 5, and the battery 689 of FIG. 6) may include the electrode assembly 600 including the cathode 610, the anode 620, and the separator 630. According to various example embodiments, the cathode 610 may include a cathode collector 811 and a cathode active material layer 812 formed in at least a region of a surface of the cathode collector 811. According to various example embodiments, different layers formed on the surface of the cathode collector 811 and the cathode active material layer 812 may be formed in a first region of the surface of the cathode collector 811. For example, the first region may correspond to one side of the cathode collector 811 or one side and the other side opposite to the one side of the cathode collector 811 and may correspond to a partial region of one side of the cathode collector 811 or a partial region of one side and a partial region of the other side opposite to the one side of the cathode collector 811.

According to various example embodiments, the cathode collector 811 may include a layer (e.g., an aluminum (Al) foil) or a plate including a metal, such as Al, and the cathode active material layer 812 may include at least one of a cathode active material, a conductive material, and/or a binder. According to various example embodiments, the cathode active material may include a material (e.g., lithium nickel cobalt manganese oxide (NCM), lithium nickel cobalt aluminum oxide (NCA), or lithium cobalt oxide (LCO)) involved in an electrode reaction, the conductive material may increase conductivity, and the binder may increase coupling between the cathode active material and the conductive material. According to various example embodiments, the cathode active material may include a lithium-based oxide.

According to various example embodiments, the anode 620 may include an anode collector 821 and an anode active material layer 822 formed in at least a region of a surface of the anode collector 821.

According to various embodiments, the anode collector 821 may include a layer (e.g., copper foil) or a plate including a metal, such as copper, and the anode active material layer 822 may include at least one of an anode active material, a conductive material, and/or a binder. According to various example embodiments, the anode active material may include a carbon material as a main component.

According to various example embodiments, an insulating layer 813 may be formed in a partial region of a surface of the cathode collector 811. The insulating layer 813 may prevent a short circuit of the cathode 610 and the anode 620. According to various example embodiments, the surface of the cathode collector 811 may include the first region in which the cathode active material layer 812 is formed and a second region in which the insulating layer 813 is formed.

According to various example embodiments, when manufacturing the cathode, after preparing the cathode collector 811, the cathode active material layer 812 may be formed in a partial region (e.g., the first region) of the surface of the cathode collector 811 and the surface of the cathode collector 811 may include an uncoated portion (or a non-coated portion) in which the cathode active material layer 812 is not formed. According to various example embodiments, the insulating layer 813 may be formed to cover at least a portion of the uncoated portion (or the non-coated region, for example, the second region). According to various example embodiments, the cathode active material layer 812 and the insulating layer 813 may be formed to be adjacent to each other.

According to various example embodiments, the electrode assembly 600 may include the separator 630 between the cathode 610 and the anode 620 such that the cathode 610 and the anode 620 do not or substantially do not contact each other. According to various example embodiments, the separator 630 may be attached to at least a portion of the insulating layer 813 of the cathode 610, for example, a surface opposite to the surface on which the insulating layer 813 is attached to the cathode collector 811. According to various example embodiments, since the separator 630 is attached to the cathode 610 and integrally formed as one, a short circuit may be prevented by effectively separating the cathode 610 from the anode 620 and deformation (e.g., curling, etc.) that may occur due to various external impacts and/or heat that may generate while using the battery.

According to various example embodiments, after preparing the cathode collector 811, the cathode 610 may be manufactured through a process of forming the cathode active material layer 812 by coating the first region with a cathode active material slurry and forming the insulating layer 813 by coating the second region with an insulating material. According to various example embodiments, a pressing process, a slitting process, and/or a vacuum drying process may be performed on the cathode 610 in which the cathode active material layer 812 and the insulating layer 813 are formed and an integrated cathode 610-separator 630 adhesion structure may be formed by stacking the separator 630 onto the cathode 610 that is cut into an appropriate size through a notching process.

According to various example embodiments, the separator 630 may include polyethylene (PE) or polypropylene (PP). For example, the separator 630 may be formed of a layer including PE or a layer including PP. For example, the separator 630 may be formed of two layers by bonding a PE layer and a PP layer. For example, the separator 630 may be formed of three layers by bonding a PP layer, a PE layer, and a PP layer.

According to various example embodiments, since the separator 630 is attached to the cathode 610 and provided between the cathode 610 and the anode 620, the outermost portion of the separator 630 may be prevented from being curled by external impact due to falling or exposure to heat. According to various embodiments, a short circuit may directly relate to the safety of the battery, the outermost portion of the separator 630 may be prevented from being curled by using a battery of which the separator 630 is attached to the cathode 610 and an internal short circuit due to contact between the cathode 610 and the anode 620 may be prevented.

According to various example embodiments, at least a portion of the separator 630 may be attached to the insulating layer 813 included in the cathode 610 and the length or the size of the separator 630 may be substantially the same as the length or the size of the cathode 610. Here, as shown in FIG. 6, the lengths and/or the sizes of the cathode 610 and the separator 630 may be measured in a direction (e.g., an x-direction or a z-direction of FIG. 8) perpendicular to a stacking direction (e.g., a y-direction of FIG. 8).

According to various example embodiments, unlike the separator provided in a size relatively greater than both electrodes to prevent the internal short circuit of the cathode and the anode, a battery of which overhang of the separator 630 is reduced and energy density is improved by reducing an unnecessary space in the battery and/or the electrode assembly 600 may be provided.

According to various example embodiments, shrinkage of the separator 630 at a high temperature may decrease by attaching the separator 630 to the cathode 610 to fix a position of the separator 630 and prevent the separator 630 from moving. According to various example embodiments, adhesion of the separator 630 may be performed by applying a temperature about 60° C. to about 90° C. and/or pressure about 80 kgf to about 120 kgf to the separator 630 and the cathode 610, thereafter, the separator 630 may be accommodated in a pouch through a post-process (e.g., a winding process, a stacking process, and/or a packaging process) and a sealed battery may be manufactured. According to various example embodiments, adhesion between the separator 630 and the cathode 610 may be performed on the cathode 610 that is cut through a notching process.

According to various example embodiments, the cathode collector 811 may have a flat sheet shape. According to various example embodiments, when viewing the cathode collector 811 in a direction (e.g., the y-direction) perpendicular to a plane of the cathode collector 811, the insulating layer 813 may be formed in the second region of the cathode collector 811 and the second region may correspond to an edge portion of the cathode collector 811. According to various example embodiments, based on the plane of the cathode collector 811, the "edge portion" may be a region including an edge of the periphery of the plane.

Referring to FIG. 8, the cathode collector 811 may have a flat sheet shape extending in the x-direction and the z-direction. When viewing the cathode collector 811 from the y-direction, which is a direction perpendicular to the cathode collector 811, the cathode active material layer 812 may be formed in a relatively central portion of the cathode collector 811 and the insulating layer 813 may be formed in a relatively edge portion of the cathode collector 811. According to various example embodiments, based on the plane of the cathode collector 811, the "central portion" may be a region that does not include the edge of the periphery of the plane. The cathode active material layer 812 may be formed in at least a region of a front surface (e.g., the +y direction surface of the cathode collector 811) and/or a rear surface (e.g., the −y direction surface of the cathode collector 811) of the cathode collector 811 having the flat sheet shape and the insulating layer 813 may be formed in at least a region of the front surface (e.g., the +y direction surface of the cathode collector 811) and/or the rear surface (e.g., the −y direction surface of the cathode collector 811) of the cathode collector 811. Here, the insulating layer 813 may be formed to cover a side surface (e.g., the +x direction surface, the −x direction surface, the +z direction surface and/or the −z direction surface of the cathode collector 811) of the cathode collector 811. According to various example embodiments, as the cathode active material layer 812 and the insulating layer 813 are formed, the cathode collector 811 may not be substantially exposed to the outside since the entire surface of the cathode collector 811 is coated.

The above description is further described with reference to FIG. 9.

Figure 9A:
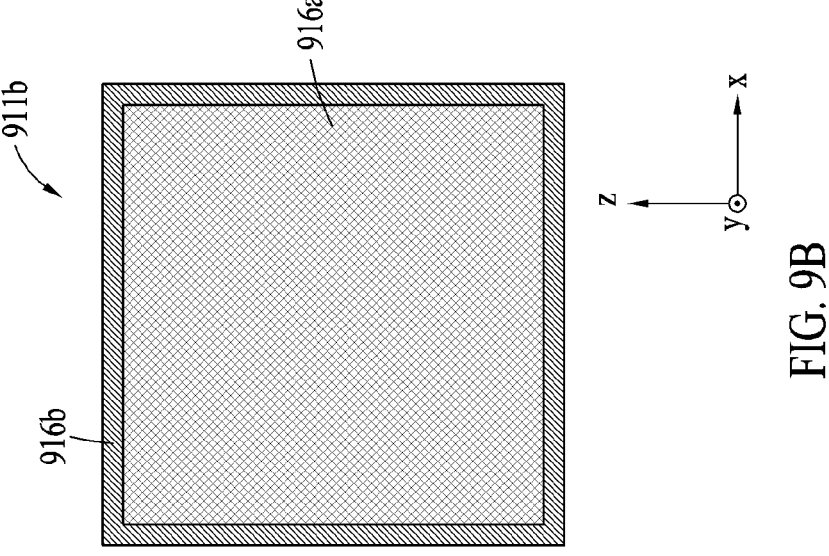
FIGS. 9A and 9B are diagrams of a cathode collector according to various example embodiments.
Figure 9B:
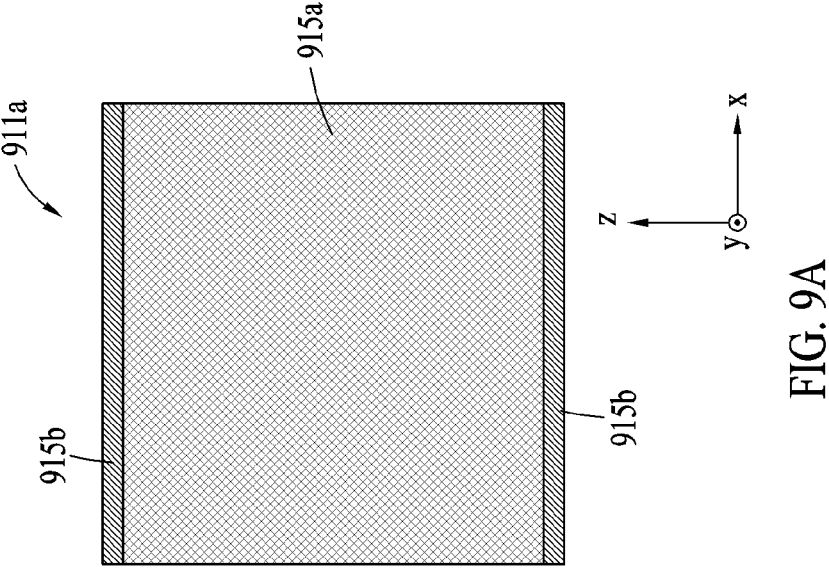

FIGS. 9A and 9B are a diagrams of a cathode collector according to various example embodiments.

FIGS. 9A and 9B are diagrams viewing the cathode collector 811 of FIG. 8 from the top, for example, viewing the cathode collector 811 from the +y direction or the −y direction.

Referring to FIG. 9A, based on a cathode collector 911a (e.g., the cathode collector 811 of FIG. 8) having a flat sheet shape, an insulating layer (e.g., the insulating layer 813 of FIG. 8) may be formed in a second region and the second region may correspond to two edges 915b parallel with each other. According to various example embodiments, a cathode (e.g., the cathode 610 of FIG. 8) may be attached to a separator (e.g., the separator 630 of FIG. 8) through the insulating layer (e.g., the insulating layer 813 of FIG. 8) formed at two parallel edges 915b or an adhesive layer. According to various example embodiments, insulating layers may be formed at two, upper and lower, edges 915b (e.g., two edges parallel with the x-axis) of the cathode collector 911a, a cathode active material layer (e.g., the cathode active material layer 812 of FIG. 8) may be formed on a central portion 915a of the cathode collector 911a, a separator (e.g., the separator 630 of FIG. 8) may be attached to the insulating layer, a cathode (e.g., the cathode 610 of FIG. 8), an anode (e.g., the anode 620 of FIG. 8), and the separator (e.g., the separator 630 of FIG. 8) may be wound in a direction (e.g., the x-direction) and form an electrode assembly in a jelly roll shape. Although the central portion 915a and the edge 915b are described based on the +y direction surface of the cathode collector 911a having a plane shape, one of ordinary skill in the art may obviously understand that a −y direction surface may be substantially the same.

According to various example embodiments, the electrode assembly 600 may be formed by stacking the cathode 610, the anode 620, and the separator 630. Referring to FIG. 9B, based on a cathode collector 911b (e.g., the cathode collector 811 of FIG. 8) having a flat sheet shape, the insulating layer (e.g., the insulating layer 813 of FIG. 8) may be formed in a second region and the second region may correspond to an edge portion 916b. According to various example embodiments, the cathode (e.g., the cathode 610 of FIG. 8) may be attached to the separator (e.g., the separator 630 of FIG. 8) through the insulating layer (e.g., the insulating layer 813 of FIG. 8) formed to cover the edge portion 916b or an adhesive layer. According to various example embodiments, the insulating layer may be formed on the edge portion 916b of the cathode collector 911b, a cathode active material layer (e.g., the cathode active material layer 812 of FIG. 8) may be formed in the central portion 916a of the cathode collector 911b, and the separator (e.g., the separator 630 of FIG. 8) may be attached to the insulating layer. According to various example embodiments, the cathode (e.g., the cathode 610 of FIG. 8) and the anode (e.g., the anode 620 of FIG. 8) may be alternately stacked, the separator (e.g., the separator 630 of FIG. 8) may be provided between the cathode and the anode, and the electrode assembly may be formed by stacking. Although the central portion 916a and the edge portion 916b are described based on the +y direction surface of the cathode collector 911b in plane shape, one of ordinary skill in the art may obviously understand that a −y direction surface may be substantially the same.

According to various example embodiments, the surface of the cathode collector 911a or 911b may include a first region and a second region. According to various example embodiments, the cathode collector 911*a* or 911*b* may have a flat sheet shape and may be a wide flat sheet having two axes in the x-direction and the z-direction, the first region may be at least a partial region of the +y-direction surface and/or the −y direction surface of the cathode collector 911*a* or 911*b*. According to various example embodiments, the first region may correspond to a central region excluding the periphery (e.g., the edge portion) of the +y direction surface and/or the −y direction surface of the cathode collector 911*a* or 911*b* and the second region may correspond to the remaining region of the surface of the cathode collector 911*a* or 911*b* excluding the first region.

According to various example embodiments, an area ratio of the first region to the second region may be 10:1 to 50:1. According to various example embodiments, a cathode active material layer (e.g., the cathode active material layer 812 of FIG. 8) may be formed in the first region of the surface of the cathode collector 911*a* or 911*b*, the insulating layer (e.g., the insulating layer 813 of FIG. 8) may be formed in the second region, and an area ratio of the surface region in which the cathode active material layer (e.g., the cathode active material layer 812 of FIG. 8) is formed to the surface region in which the insulating layer (e.g., the insulating layer 813 of FIG. 8) is formed may be 10:1 to 50:1.

According to various example embodiments, the insulating layer (e.g., the insulating layer 813 of FIG. 8) may include at least one of fiber resin, plastic nonwoven fabric, alumina, magnesium oxide, silica, boehmite, barium titanate, barium carbonate, yttria, or manganese oxide. According to various example embodiments, the insulating layer (e.g., the insulating layer 813 of FIG. 8) may prevent the cathode collectors 911*a* and 911*b* from being exposed to the outside such that a short circuit between the cathode (e.g., the cathode 610 of FIG. 8) and the anode (e.g., the anode 620 of FIG. 8) may be prevented. In addition, since the insulating layer is adhesive, the insulating layer may be easily bonded to the separator (e.g., the separator 630 of FIG. 8).

Figure 10:
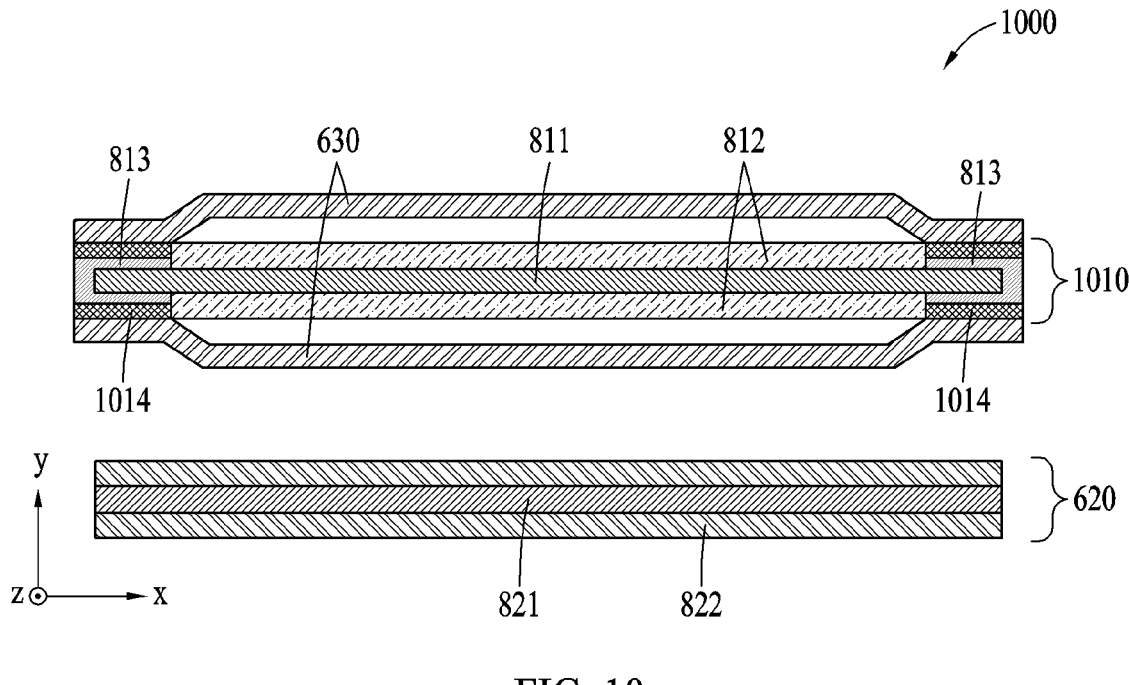
FIG. 10 is a diagram of an electrode assembly according to various example embodiments.

FIG. 10 is a diagram of an electrode assembly according to various example embodiments.

Referring to FIG. 10, an electrode assembly 1000 may include a cathode 1010, the anode 620, and the separator 630 and the anode 620 may include the anode collector 821 and the anode active material layer 822 formed in at least one region of the surface of the anode collector 821. According to various example embodiments, the cathode 1010 may include the cathode collector 811, the cathode active material layer 812 formed in at least one region (e.g., the first region) of the surface of the cathode collector 811, and the insulating layer 813 formed in at least one region (e.g., the second region) of the surface of the cathode collector 811.

According to various example embodiments, an adhesive layer 1014 may be further formed between the insulating layer 813 and the separator 630. According to various example embodiments, the adhesive layer 1014 may be formed in at least one region of the surface of the insulating layer 813 and the separator 630 may be prevented from being separated from the cathode 610 by the adhesiveness of the adhesive layer 1014.

According to various example embodiments, the adhesive layer 1014 may include at least one of acrylic resin, fluorine-based resin, rubber-based resin, and natural polymer resin. According to various example embodiments, the adhesive layer 1014 may include at least one of acrylic resin, such as methyl methacrylate, ethyl methacrylate, methyl acrylate, and/or ethyl acrylate, fluorine-based resin, such as polyvinylidene fluoride (PVDF), rubber-based resin, such as styrene butadiene rubber (SBR), and natural polymer resin, such as maleic acid, arabic gum, guar gum, chitosan, and/or polydopamine.

According to various example embodiments, after preparing the cathode collector 811, the cathode 1010 may be manufactured through a process of forming the cathode active material layer 812 by coating the first region with a cathode active material slurry and forming the insulating layer 813 by coating the second region with an insulating material. In addition, according to various example embodiments, a process of forming the adhesive layer 1014 by coating with an adhesive material to cover at least a portion of the surface of the insulating layer 813 may be additionally performed. According to various example embodiments, a pressing process, a slitting process, and/or a vacuum drying process may be performed on the cathode 1010 in which the cathode active material layer 812, the insulating layer 813, and the adhesive layer 1014 are formed and an integrated cathode 1010-separator 630 adhesion structure may be formed by stacking the separator 630 onto the cathode 1010 that is cut into an appropriate size through a notching process.

According to various example embodiments, the thickness of the insulating layer 813 may be the same as or different from the thickness of the adhesive layer 1014. According to various example embodiments, referring to FIG. 10, the thicknesses of the cathode active material layer 812, the insulating layer 813, and/or the adhesive layer 1014 may be measured based on the y-direction, for example, the thicknesses of the cathode active material layer 812, the insulating layer 813, and/or the adhesive layer 1014 formed in the +y direction surface or the −y direction surface of the cathode collector 811 may be measured. However, the example is not limited thereto. According to various example embodiments, the cathode active material layer 812, the insulating layer 813, and/or the adhesive layer 1014 may have a stacked structure and each thickness thereof may be measured based on a stacking direction.

According to various example embodiments, a thickness ratio of the insulating layer 813 to the adhesive layer 1014 may be 1:1 to 2:1. According to various example embodiments, when the thickness of the cathode active material layer 812 is compared with a sum of the thickness of the insulating layer 813 and the thickness of the adhesive layer 1014, a ratio of the thickness of the cathode active material layer 812 to the sum of the thicknesses of the insulating layer 813 and the adhesive layer 1014 may be 1:0.5 to 1:2.

According to various example embodiments, the size of the cathode active material layer 812 may be the same as or different from the size of the anode active material layer 822. According to various example embodiments, the cathode active material layer 812 formed on at least a portion of the surface of the cathode collector 811 may not be formed on the edge portion of the cathode collector 811 due to the formation of the insulating layer 813, the size of the cathode collector 811 may be the same as the size of the anode collector 821, and thus, the size and/or the area of the cathode active material layer 812 and the anode active material layer 822 may be different. According to various example embodiments, an area ratio of the cathode active material layer 812 and the anode active material layer 822 may be 1:1.01 to 1:1.5. According to various example embodiments, an amount of cathode active materials included in the cathode active material layer 812 may be less than an amount of anode active materials included in the anode active material layer 822.

According to various example embodiments, a plurality of cathodes 610 or 1010 and a plurality of anodes 620 may be provided and may be alternately stacked. According to various example embodiments, a plurality of separators 630 may be provided and the separator 630 may be provided between the cathode 610 or 1010 and the anode 620 and may prevent the cathode 610 or 1010 from contacting the anode 620.

According to various example embodiments, the battery may further include the cathode tab 640 protruding from the cathode 610 or 1010 and the anode tab 650 protruding from the anode 620. The electrode assembly 600 or 1000 may convert chemical energy of the cathode 610 or 1010 and the anode 620 into electrical energy, may accumulate chemical energy by using electrical energy, and may supply power to a circuit (e.g., the power management module 188 of FIG. 2) through the cathode tab 640 connected to the cathode 610 and the anode tab 650 connected to the anode 620.

According to various example embodiments, the battery may further include an electrolyte. According to various example embodiments, the electrolyte may be a medium that allows an ion to move such that oxidation and/or deoxidation of the cathodes 610 and 1010 or the anode 620 may chemically harmonize, and may include, for example, a material in a liquid, a solid, or a gel state. For example, when charging the battery, due to the oxidation of the cathode 610 or 1010 and the deoxidation of the anode 620, a lithium ion may be released from the cathode 610 or 1010, pass through the electrolyte, and move to the anode 620 and an electron may flow from the cathodes 610 and 1010 to the anode 620 along a circuit (e.g., the power management module 188 of FIG. 2) connected to the cathode tab 640 and the anode tab 650. For example, when the battery is discharged, due to the deoxidation of the cathode 610 or 1010 and the oxidation of the anode 620, a lithium ion may be released from the anode 620, pass through an electrolyte, and move to the cathode 610 or 1010 and an electron may flow from the anode 620 to the cathode 610 or 1010 along a circuit (e.g., the power management module 188 of FIG. 2) connected to the cathode tab 640 and the anode tab 650.

According to various example embodiments, the battery may further include the pouch 660. The pouch 660 may accommodate the electrode assembly 600 or 1000 and may seal the electrode assembly 600 or 1000 from the outside. According to various example embodiments, the electrode assembly 600 or 1000 may be fixed to the inner surface of the pouch 660, the adhesive member 661 may be disposed between the outer surface of the electrode assembly 600 or 1000 and the inner surface of the pouch 660 such that the electrode assembly 600 or 1000 may not move or not be shaken in the inner space of the pouch 660.

According to various example embodiments, the adhesive member 661 formed on the outer surface of the electrode assembly 600 or 1000 may attach the pouch 660 to the electrode assembly 600 or 1000.

According to various example embodiments, the adhesive member 661 may be formed by a binder including various materials which may implement adhesion between the pouch 660 and the electrode assembly 600 or 1000. According to various example embodiments, when the electrode assembly 600 or 1000 and the pouch 660 are compressed after applying the binder in a dot pattern to the outer surface of the electrode assembly 600 or 1000, the adhesive member 661 including the binder may be in a thin film state between the electrode assembly 600 or 1000 and the pouch 660. According to various embodiments, the adhesive member

661 may be formed in a thin film having a thickness of about 5 μm to about 50 μm and thus may contribute to reduce the thickness of the battery.

According to various example embodiments, the adhesive member 661 may include at least one of acrylic resin, fluorine-based resin, rubber-based resin, and natural polymer resin. According to various example embodiments, the adhesive member 661 may include at least one of acrylic resin, such as methyl methacrylate, ethyl methacrylate, methyl acrylate, and/or ethyl acrylate, fluorine-based resin, such as PVDF, rubber-based resin, such as SBR, and natural polymer resin, such as maleic acid, arabic gum, guar gum, chitosan, and/or polydopamine.

According to various example embodiments, the electrode assembly 600 or 1000 may be formed by being wound in a jelly roll shape. According to various example embodiments, the electrode assembly 600 or 1000 may be formed in a jelly roll shape through stacking the cathode 610 or 1010, the anode 620, and the separator 630 and winding, and the battery may be formed through a process of disposing the electrode assembly 600 or 1000 in the inner space of the pouch 660, injecting an electrolyte, and sealing.

According to various example embodiments, the cathode 610 or 1010 of the electrode assembly 600 or 1000 wound in a jelly roll shape may correspond to the cathode 610 or 1010 in a flat sheet shape, being wound, and hereinafter, the description is provided based on the cathode 610 or 1010 before being wound. According to various example embodiments, the cathode active material layer 812 formed on at least a portion of the surface of the cathode collector 811 in a flat sheet shape and the insulating layer 813 formed in the other portion of the of the surface of the cathode collector another portion may be formed.

According to various example embodiments, the cathode collector (e.g., the cathode collector 811 of FIG. 8) may have a flat sheet shape and the second region may correspond to an edge portion (e.g., the edge 915*b* and the edge portion 916*b* of FIG. 9) of the cathode collector (e.g., the cathode collector 811 of FIG. 8) having the flat sheet shape.

According to various example embodiments, the second region may correspond to a region of the surface of the cathode collector (e.g., the cathode collector 811 of FIG. 8) other than the first region.

According to various example embodiments, an area ratio of the first region to the second region may be 10:1 to 50:1.

According to various example embodiments, the insulating layer (e.g., the insulating layer 813 of FIG. 8) may include at least one of fiber resin, plastic nonwoven fabric, alumina, magnesium oxide, silica, boehmite, barium titanate, barium carbonate, yttria, or manganese oxide.

According to various example embodiments, the battery (e.g., the battery 689 of FIG. 6) may further include an adhesive layer (e.g., the adhesive layer 1014 of FIG. 10) formed between the insulating layer (e.g., the insulating layer 813 of FIG. 10) and the separator (e.g., the separator 630 of FIG. 10).

According to various example embodiments, the adhesive layer (e.g., the adhesive layer 1014 of FIG. 10) may include at least one of acrylic resin, fluorine-based resin, rubber-based resin, and natural polymer resin.

According to various example embodiments, a thickness ratio of the insulating layer (e.g., the insulating layer 813 of FIG. 10) to the adhesive layer (e.g., the adhesive layer 1014 of FIG. 10) may be 1:1 to 2:1.

According to various example embodiments, an area ratio of the cathode active material layer (e.g., the cathode active material layer 812 of FIG. 8) and the anode active material layer (e.g., the anode active material layer 822 of FIG. 8) may be 1:1.01 to 1:1.5.

According to various example embodiments, a plurality of cathodes (e.g., the cathode 610 of FIG. 8) and a plurality of anodes (e.g., the anode 620 of FIG. 8) may be configured and the cathodes (e.g., the cathode 610 of FIG. 8) and the anodes (e.g., the anode 620 of FIG. 8) may be alternately stacked.

According to various example embodiments, the battery may further include a cathode tab (e.g., the cathode tab 640 of FIG. 7) protruding from the cathode (e.g., the cathode 610 of FIG. 7) and an anode tab (e.g., the anode tab 650 of FIG. 7) protruding from the anode (e.g., the anode 620 of FIG. 7).

According to various example embodiments, the battery may further include a pouch (e.g., the pouch 660 of FIG. 6) and the electrode assembly (e.g., the electrode assembly 600 of FIG. 6) may be accommodated in the pouch (e.g., the pouch 660 of FIG. 6) and sealed from the outside.

According to various example embodiments, the battery may further include an adhesive member (e.g., the adhesive member 661 of FIG. 6) formed on the outer surface of the electrode assembly (e.g., the electrode assembly 600 of FIG. 6) and the adhesive member (e.g., the adhesive member 661 of FIG. 6) may couple the pouch (e.g., the pouch 660 of FIG. 6) to the electrode assembly (e.g., the electrode assembly 600 of FIG. 6).

According to various example embodiments, the adhesive member (e.g., the adhesive member 661 of FIG. 6) may include at least one of acrylic resin, fluorine-based resin, rubber-based resin, and natural polymer resin.

According to various example embodiments, the electrode assembly (e.g., the electrode assembly 600 of FIG. 6) may be formed by being wound in a jelly roll shape.

According to various example embodiments, the cathode collector (e.g., the cathode collector 911a of FIG. 9) may have a flat sheet shape and the second region may correspond to two parallel edges (e.g., the edge 915b of FIG. 9) parallel with each other among the edge portion of the cathode collector (e.g., the cathode collector 911a of FIG. 9) having the flat sheet shape.

According to various example embodiments, the electrode assembly (e.g., the electrode assembly 600 of FIG. 8) may be formed by stacking, the cathode collector (e.g., the cathode collector 911b of FIG. 9) may have a flat sheet shape, and the second region may correspond to an edge portion (e.g., the edge portion 916b of FIG. 9) of the cathode collector (e.g., the cathode collector 911b of FIG. 9) in the flat sheet shape.

According to various example embodiments, an electronic device (e.g., the electronic device 101 of FIG. 1, the electronic device 300 of FIG. 3, and the electronic device 500 of FIG. 5) may include a housing including a front plate (e.g., the front plate 520 of FIG. 5), a rear plate (e.g., the rear plate 580 of FIG. 5), and a bracket (e.g., the side bezel structure 510 of FIG. 5 and the first support member 511 of FIG. 5) enclosing a gap between the front plate and the rear plate, a display (e.g., the display 530 of FIG. 5) to display information to the outside through at least a region of the front plate, and a battery (e.g., the battery 550 of FIG. 5) mounted in a mounting groove of the bracket, wherein the battery may include an electrode assembly (e.g., the electrode assembly 600 of FIG. 6), the electrode assembly may include a cathode collector (e.g., the cathode collector 811 of FIG. 8), a cathode (e.g., the cathode 610 of FIG. 8) including a cathode active material layer (e.g., the cathode active material layer 812 of FIG. 8) formed in a first region of the surface of the cathode collector (e.g., the cathode collector 811 of FIG. 8) and an insulating layer (e.g., the insulating layer 813 of FIG. 8) formed in the second region of the surface of the cathode collector to be adjacent to the cathode active material layer, an anode (e.g., the anode 620 of FIG. 8) including an anode collector (e.g., the anode collector 821 of FIG. 8) and an anode active material layer (e.g., the anode active material layer 822 of FIG. 8) formed in a region of the surface of the anode collector (e.g., the anode collector 821 of FIG. 8), and a separator (e.g., the separator 630 of FIG. 6) provided between the cathode (e.g., the cathode 610 of FIG. 8) and the anode (e.g., the anode 620 of FIG. 8), and the separator (e.g., the separator 630 of FIG. 6) may be attached to at least a portion of the insulating layer (e.g., the insulating layer 813 of FIG. 8). According to various example embodiments, the battery may be coupled to the bracket through double-sided tape.

According to various example embodiments, the battery (e.g., the battery 550 of FIG. 5) may further include a pouch (e.g., the pouch 660 of FIG. 6), the electrode assembly (e.g., the electrode assembly 600 of FIG. 6) may be accommodated in the pouch and sealed from the outside, the bracket (e.g., the side bezel structure 510 of FIG. 5 and the first support member 511 of FIG. 5) may be formed to face the pouch and may include a recess into which the pouch fits. According to various example embodiments, the bracket may include an indented recess and the battery (e.g., the battery 550 of FIG. 5) may be disposed in the recess. The recess may be formed in a size corresponding to the horizontal width or the vertical width of the battery. The battery may be disposed in the recess and may be fixed to the support member without moving.

According to various example embodiments, the battery (e.g., the battery 550 of FIG. 5) may be coupled to the bracket through double-sided tape.

According to various example embodiments, the battery (e.g., the battery 689 of FIG. 6) may further include the pouch (e.g., the pouch 660 of FIG. 6), the electrode assembly (e.g., the electrode assembly 600 of FIG. 6) may be accommodated in the pouch (e.g., the pouch 660 of FIG. 6) and sealed from the outside, and the bracket may be formed to face the pouch (e.g., the pouch 660 of FIG. 6) and may include a recess into which the pouch (e.g., the pouch 660 of FIG. 6) fits.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Also, while embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and it is intended that such modifications are not to be interpreted independently from the technical idea or prospect of the disclosure.

What is claimed is:

1. A battery comprising:
an electrode assembly comprising:
    a cathode comprising:
        a cathode collector,
        a cathode active material layer provided in a first region of a surface of the cathode collector, and
        an insulating layer provided in a second region of the surface of the cathode collector and adjacent to the cathode active material layer;
    an anode comprising an anode collector and an anode active material layer provided in a region of a surface of the anode collector; and
    a separator provided between the cathode and the anode,
wherein a first portion of the separator is adhered to a first surface of the insulating layer,
wherein a second portion of the separator is spaced apart from the cathode active material layer in a first direction, and
wherein the first surface of the insulating layer is at a level that is the same as a level of a surface of the cathode active material layer in a second direction intersecting the first direction.

2. The battery of claim 1, wherein the cathode collector has a flat sheet shape, and
wherein the second region corresponds to an edge portion of the cathode collector.

3. The battery of claim 1, wherein the second region of the surface of the cathode corresponds to a region of the surface of the cathode collector that is different from the first region.

4. The battery of claim 1, wherein an area ratio of the first region to the second region is about 10:1 to about 50:1.

5. The battery of claim 1, wherein the insulating layer comprises at least one of fiber resin, plastic nonwoven fabric, alumina ($Al_2O_3$), magnesium oxide (MgO), silica ($SiO_2$), boehmite, barium titanate ($BaTiO_3$), barium carbonate ($BaCO_3$), yttria, and manganese oxide ($MnO_2$).

6. The battery of claim 1, wherein an area ratio of the cathode active material layer to the anode active material layer is about 1:1.01 to about 1:1.5.

7. The battery of claim 1, further comprising:
a plurality of cathodes including the cathode; and
a plurality of anodes including the anode, and
    wherein the plurality of cathodes and the plurality of anodes are alternately stacked.

8. The battery of claim 1, further comprising:

a cathode tab protruding from the cathode; and an anode tab protruding from the anode.

9. The battery of claim 1, further comprising a pouch in which the electrode assembly is accommodated and sealed from an outside.

10. The battery of claim 9, further comprising an adhesive member provided on an outer surface of the electrode assembly, wherein the adhesive member couples the pouch to the electrode assembly.

11. The battery of claim 10, wherein the adhesive member comprises at least one of acrylic resin, fluorine-based resin, rubber-based resin, and natural polymer resin.

12. The battery of claim 1, wherein the electrode assembly is wound in a roll shape.

13. The battery of claim 12, wherein the cathode collector has a flat sheet shape, and wherein the second region corresponds to two edges parallel with each other in an edge portion of the cathode collector.

14. The battery of claim 1, wherein the electrode assembly is formed by stacking the cathode, the anode and the separator, wherein the cathode collector has a flat sheet shape, and wherein the second region corresponds to an edge portion of the cathode collector.

15. A battery comprising:

an electrode assembly comprising:

a cathode comprising:

a cathode collector, a cathode active material layer provided in a first region of a surface of the cathode collector, and an insulating layer provided in a second region of the surface of the cathode collector and adjacent to the cathode active material layer;

an anode comprising an anode collector and an anode active material layer provided in a region of a surface of the anode collector; and a separator provided between the cathode and the anode, and an adhesive layer provided between the insulating layer and the separator, wherein a first portion of the separator is adhered to a first surface of the adhesive layer, wherein a second portion of the separator is spaced apart from the cathode active material layer in a first direction, and wherein the first surface of the adhesive layer is at a level that is the same as a level of a surface of the cathode active material layer in a second direction intersecting the first direction.

16. The battery of claim 15, wherein the adhesive layer comprises at least one of acrylic resin, fluorine-based resin, rubber-based resin, and natural polymer resin.

17. The battery of claim 15, wherein a thickness ratio of the insulating layer to the adhesive layer is about 1:1 to about 2:1.

18. An electronic device comprising:

a housing comprising a front plate, a rear plate, and a bracket enclosing a gap between the front plate and the rear plate;

a display configured to display information through at least a region of the front plate of the housing; and a battery mounted in a mounting groove of the bracket, wherein the battery comprises an electrode assembly, and wherein the electrode assembly comprises:

a cathode comprising:

a cathode collector, a cathode active material layer provided in a first region of a surface of the cathode collector, and an insulating layer provided in a second region of the surface of the cathode collector and adjacent to the cathode active material layer, an anode comprising an anode collector and an anode active material layer provided in a region of a surface of the anode collector, and a separator provided between the cathode and the anode, and wherein a first portion of the separator is adhered to a first surface of the insulating layer, wherein a second portion of the separator is spaced apart from the cathode active material layer in a first direction, and wherein the first surface of the insulating layer is at a level that is the same as a level of a surface of the cathode active material layer in a second direction intersecting the first direction.

19. The electronic device of claim 18, wherein the battery is provided in the bracket.

20. The electronic device of claim 18, wherein the battery further comprises a pouch in which the electrode assembly is accommodated and sealed from the outside, and wherein the bracket is configured to face the pouch and comprises a recess into which the pouch fits.

* * * * *